United States Patent
Desai et al.

(10) Patent No.: US 12,118,411 B2
(45) Date of Patent: Oct. 15, 2024

(54) DISTRIBUTED SCHEDULER PROVIDING EXECUTION PIPE BALANCE

(71) Applicants: ADVANCED MICRO DEVICES, INC., Santa Clara, CA (US); ATI TECHNOLOGIES ULC, Markham (CA)

(72) Inventors: Sneha V. Desai, Markham (CA); Michael Estlick, Fort Collins, CO (US); Erik Swanson, Fort Collins, CO (US); Anilkumar Ranganagoudra, Austin, TX (US)

(73) Assignees: Advanced Micro Devices, Inc., Santa Clara, CA (US); ATI Technologies ULC, Markham (CA)

(*) Notice: Subject to any disclaimer, the term of this patent is extended or adjusted under 35 U.S.C. 154(b) by 53 days.

(21) Appl. No.: 16/568,038

(22) Filed: Sep. 11, 2019

(65) Prior Publication Data

US 2021/0073056 A1     Mar. 11, 2021

(51) Int. Cl.
  *G06F 9/54* (2006.01)
  *G06F 9/50* (2006.01)
  *G06F 9/52* (2006.01)

(52) U.S. Cl.
  CPC .......... *G06F 9/544* (2013.01); *G06F 9/505* (2013.01); *G06F 9/5083* (2013.01); *G06F 9/528* (2013.01); *G06F 9/546* (2013.01)

(58) Field of Classification Search
  CPC ........ G06F 9/544; G06F 9/505; G06F 9/5083; G06F 9/528; G06F 9/546
  See application file for complete search history.

(56) References Cited

U.S. PATENT DOCUMENTS 6,826,704 B1 * 11/2004 Pickett .................... G06F 9/384
                                                           712/E9.035
6,877,086 B1    4/2005 Boggs et al.
(Continued)

FOREIGN PATENT DOCUMENTS

CN        113254192 A    *   8/2021

OTHER PUBLICATIONS

International Search Report and Written Opinion issued Dec. 10, 2020 in Application No. PCT/US2020/049918, 10 pages.
(Continued)

*Primary Examiner* — Kevin L Young
*Assistant Examiner* — Kimberly L Jordan

(57) ABSTRACT

A processor includes a plurality of execution pipes and a distributed scheduler coupled to the plurality of execution pipes. The distributed scheduler includes a first queue to buffer instruction operations from a front end of an instruction pipeline of the processor and a plurality of second queues, wherein each second queue is to buffer instruction operations allocated from the first queue for a corresponding separate subset of execution pipes of the plurality of execution pipes. The distributed scheduler further includes a queue controller to select an allocation mode from a plurality of allocation modes based on whether at least one indicator of an imbalance at the distributed scheduler is detected, and further to control the distributed scheduler to allocate instruction operations from the first queue among the plurality of second queues in accordance with the selected allocation mode.

25 Claims, 6 Drawing Sheets

(56) References Cited

U.S. PATENT DOCUMENTS

| | | | |
|---|---|---|---|
| 8,347,302 B1* | 1/2013 | Vincent | G06F 9/5011 |
| | | | 718/103 |
| 2002/0004895 A1 | 1/2002 | Corwin et al. | |
| 2005/0251660 A1* | 11/2005 | Bell | G06F 9/3824 |
| | | | 712/225 |
| 2006/0212873 A1 | 9/2006 | Takahisa et al. | |
| 2012/0023314 A1 | 1/2012 | Crum et al. | |
| 2012/0096468 A1* | 4/2012 | Chakravorty | G06F 9/50 |
| | | | 718/103 |
| 2012/0110594 A1 | 5/2012 | Talpes et al. | |
| 2013/0247072 A1* | 9/2013 | Kang | G06F 9/30189 |
| | | | 719/318 |
| 2015/0089198 A1 | 3/2015 | Sommers et al. | |
| 2015/0134934 A1 | 5/2015 | Abdallah | |
| 2016/0266930 A1 | 9/2016 | Jones et al. | |
| 2017/0147369 A1 | 5/2017 | Spracklen | |
| 2017/0286114 A1 | 10/2017 | Herdrich et al. | |
| 2018/0011738 A1 | 1/2018 | Abdallah | |
| 2021/0117196 A1* | 4/2021 | Nair | G06F 9/3867 |

OTHER PUBLICATIONS

International Preliminary Report on Patentability mailed Mar. 24, 2022 for PCT/US2020/049918, 6 pages.
Extended European Search Report issued in Application No. 20862681.2, mailed Aug. 17, 2023, 8 pages.

* cited by examiner

DISTRIBUTED SCHEDULER PROVIDING EXECUTION PIPE BALANCE

BACKGROUND

A distributed scheduler employs at least two levels of scheduler queues, with a first level having a non-pickable scheduler queue and a second level having two or more pickable scheduler queues, with each of the pickable scheduler queues operating to store instruction operations for a corresponding subset of a plurality of execution pipes. The non-pickable scheduler queue serves to temporarily buffer instruction operations from the instruction pipeline front end before the instruction operations are allocated to the pickable scheduler queues.

Because each pickable scheduler queue exclusively serves its own subset of execution pipes, there often is potential for performance-inhibiting imbalances between the different pickable scheduler queues, between the different execution pipes, or a combination thereof. To illustrate, as a result of the particular manner in which a program is constructed or compiled, or though coincidence of queue allocation, one pickable scheduler queue can be burdened with a number of instruction operations that each requires a significant number of cycles, such as operations dependent on a load operation, while another pickable scheduler queue can have a smaller proportion of operations that incur such delays. As another example, one pickable scheduler queue may be allocated a higher number of operations that can only be executed by a particular execution pipe associated with that queue than another pickable scheduler queue with a similar execution pipe. As a result, the execution pipe associated with one pickable scheduler queue experiences excessive occupancy while the other similar execution pipe is unnecessarily idled. Such skewed queue/pipe occupancies typically lead to a lower number of operations being picked per cycle, as well leading to underutilized execution pipes, either of which negatively impacts execution performance at the processor core implementing an instruction pipeline with the distributed scheduler.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
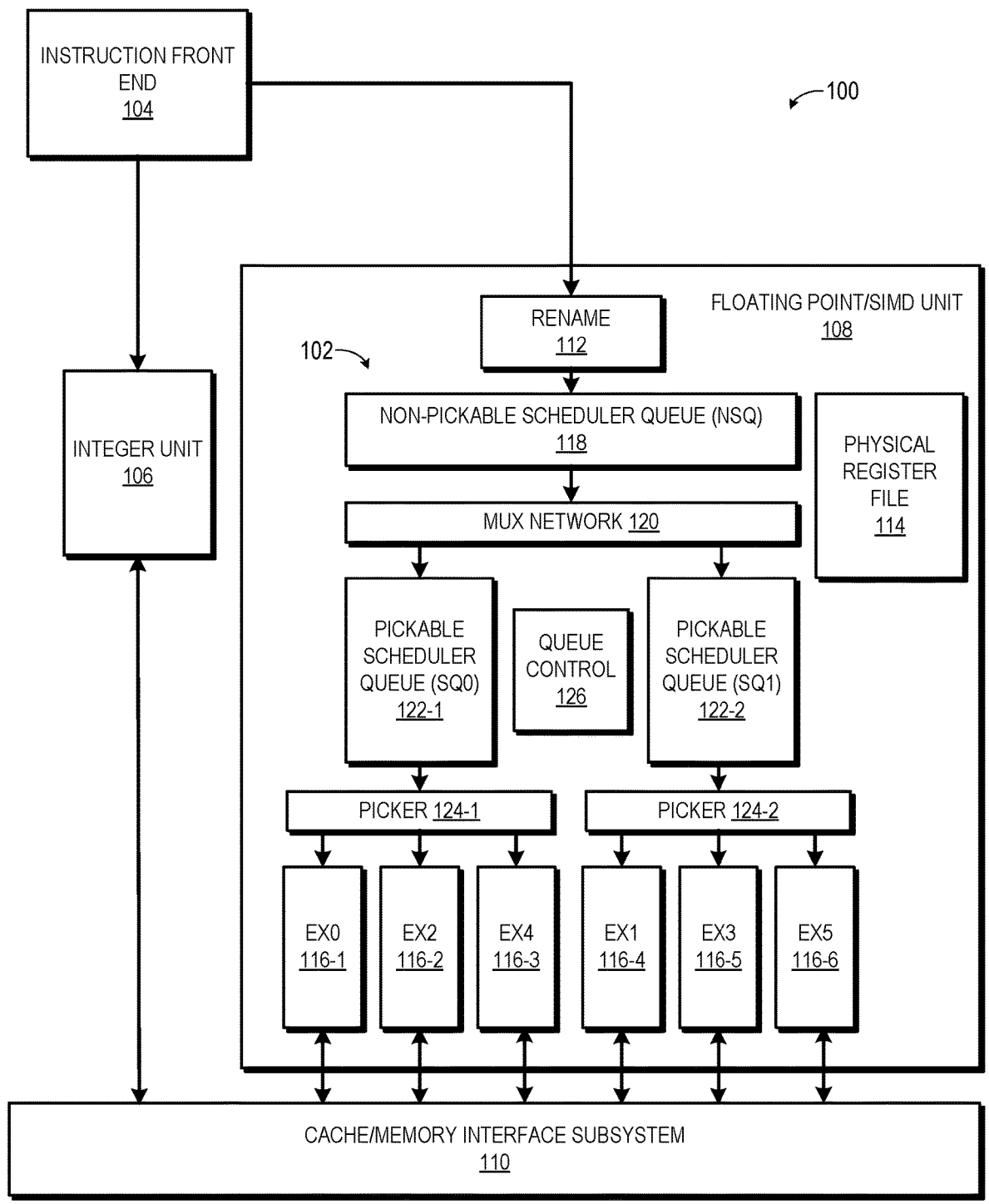
FIG. 1 is a block diagram illustrating a processor implementing a multimodal distributed scheduler in accordance with some embodiments.

FIGS. 1-8 illustrate example techniques for mitigating queue imbalances and pipe imbalances in a processing system employing a multimodal distributed scheduler for instruction operation execution scheduling. In at least one embodiment, a distributed scheduler includes a non-pickable scheduler queue to temporarily buffer instruction operations from the instruction front end of a processor and two or more pickable scheduler queues to receive instruction operations from the non-pickable scheduler queue, wherein each of the pickable scheduler queues operates to buffer instruction operations for an associated, separate subset of a set of execution pipes serviced by the distributed scheduler. The distributed scheduler further includes a queue controller to configure the distributed scheduler to allocate instruction operations from the non-pickable scheduler queue among the pickable scheduler queues in accordance with a select allocation mode of a plurality of allocation modes supported by the distributed scheduler. In at least one embodiment, the queue controller selects the allocation mode to be implemented in response to the presence or absence of one or more indicia of an imbalance between the pickable scheduler queues or between execution pipes of the same or similar capabilities. Such indicia include, for example, a queue occupancy exceeding a threshold, a pipe occupancy exceeding a threshold, a difference between queue occupancies of two or more queues exceeding a threshold, a difference between pipe occupancies of two or more execution pipes of same or similar type exceeding a threshold, a rate at which instruction operations are picked for execution falling below a threshold, and the like.

In some embodiments, the plurality of allocation modes supported by the multimodal distributed scheduler includes a queue-first allocation mode in which the subset of instruction operations to be allocated to the pickable scheduler queues in a given allocation cycle are allocated substantially equally among the pickable scheduler queues, such as via an interleaving pattern. To further ensure equitable distribution of instruction operations, in some embodiments, the interleaving pattern starts with a different pickable scheduler queue for each allocation cycle, wherein the pickable scheduler queue to receive the initial instruction operation in the interleaving pattern for a given allocation cycle is selected, for example, in accordance with a specified, fixed selection sequence (e.g., an alternating or "ping-pong" sequence) or pseudo-randomly, such as by using the output value of a linear-feedback shift register (LFSR) or other pseudo-random number generator. Further, in some embodiments, the plurality of allocation modes also includes a pipe-first allocation mode in which the pipe occupancies of each of the execution pipes suited to execute an instruction operation to be allocated are considered, and the execution pipe, and corresponding associated pickable queue, selected for executing an instruction operation is based on a comparison and evaluation of these pipe occupancies.

In some embodiments, the plurality of allocation modes supported by the multimodal distributed scheduler includes a speculative allocation mode in which, for a given allocation cycle, copies of the same instruction operation are speculatively allocated from the non-pickable scheduler queue to each of the plurality of pickable scheduler queues. Thereafter, the queue controller selects a suitable execution pipe for executing the instruction operation, and thus maintains the copy of the instruction operation as valid in the pickable scheduler queue associated with the selected execution pipe while invalidating the copies of the instruction operation in the other pickable scheduler queues.

FIG. 1 illustrates a processor 100 implementing multimodal distributed scheduler 102 for queue and execution pipe balancing in accordance with some embodiments. The processor 100 includes an instruction front end 104, one or more instruction execution units, such as an integer unit 106 and a floating point/single instruction multiple data (SIMD) unit 108, and a cache/memory interface subsystem 110. The instruction front end 104 operates to fetch instructions as part of an instruction stream, decode instructions into one or more instruction operations (e.g., micro-operations, or uops), and then dispatch each instruction operation to one of the execution units 106, 108 for execution. In executing an instruction operation, the execution unit frequently makes use of one or more caches implemented at the cache/memory interface subsystem 110, or accesses data from, or provides data for storage to, an external memory (e.g., a random access memory, or RAM) or external input/output (I/O) device via a load/store unit (LSU), memory controller, or I/O controller (not shown) of the cache/memory interface subsystem 110.

The processor 100 implements the multimodal distributed scheduler 102 at each of one or more of the execution units of the processor 100. For purposes of illustration, an implementation in which the multimodal distributed scheduler 102 is implemented at the floating point/SIMD unit 108 is described herein. However, in other embodiments the integer unit 106 or other execution unit of the processor 100 implements a multimodal distributed scheduler in addition to, or instead of, the one implemented by the floating point/SIMD unit 108 using the guidelines provided herein.

The floating point/SIMD unit 108 includes a rename module 112, a physical register file 114, and a plurality of execution pipes 116, such as the six execution pipes 116-1 to 116-6 in the depicted embodiment, as well as the multimodal distributed scheduler 102. The rename module 112 performs renaming operations for the instruction operations received from the instruction front end 104, including renaming of architected registers to physical registers in the physical register file 114, and outputs the renamed instruction operations to the multimodal distributed scheduler 102 for buffering and allocation among the execution pipes 116. In at least one embodiment, the multimodal distributed scheduler 102 includes a first scheduler queue 118, a multiplexer (mux) network 120, a plurality of second scheduler queues 122 and a picker 124 for each second scheduler queue 122, such as the illustrated two second scheduler queues 122-1 and 122-2 and corresponding pickers 124-1 and 124-2, and a queue controller 126. Each second scheduler queue 122 serves to buffer instruction operations for a corresponding separate subset of the plurality of execution pipes 116. For example, in the illustrated embodiment the second scheduler queue 122-1 buffers instruction operations for a subset composed of execution pipes 116-1, 116-2, and 116-3, whereas the second scheduler queue 122-2 buffers instruction operations for a separate subset composed of execution pipes 116-4, 116-5, and 116-6.

The multimodal distributed scheduler 102 implements a two-level queueing process, whereby the first scheduler queue 118 temporarily buffers instruction operations, which are then allocated among the plurality of second scheduler queues 122 via the mux network 120. The picker 124 for each second scheduler queue 122 then picks instruction operations buffered in the corresponding second scheduler queue 122 for assignment or other allocation to execution pipes of the subset associated with the corresponding second scheduler queue 122. As instruction operations are not pickable for execution directly from the first scheduler queue 118, the first scheduler queue 118 is referred to herein as the "non-pickable scheduler queue 118" or the "NSQ 118". Conversely, as instruction operations are pickable from the second scheduler queues 122 for execution, the second scheduler queues 122 are each referred to herein as a "pickable scheduler queue 122" or "SQ 122".

In at least one embodiment, the multimodal distributed scheduler 102 supports a plurality of allocation modes, with each allocation mode representing a particular process for allocating instruction operations from the NSQ 118 to the SQs 122 during a given allocation cycle. Each allocation mode typically addresses a current or predicted execution inefficiency, and thus the queue control 126, in one embodiment, selects a particular allocation mode to implement for the next one or more allocation cycles based on the presence or absence of one or more indicia of imbalance or execution inefficiency potentially addressed by the selected allocation mode, and then configures the mux network 120 and a picker 124 to implement the selected allocation mode. Examples of the allocation modes supported by the multimodal distributed scheduler 102 and example processes for selecting a particular allocation mode for implementation are described in detail below.

Figure 2:
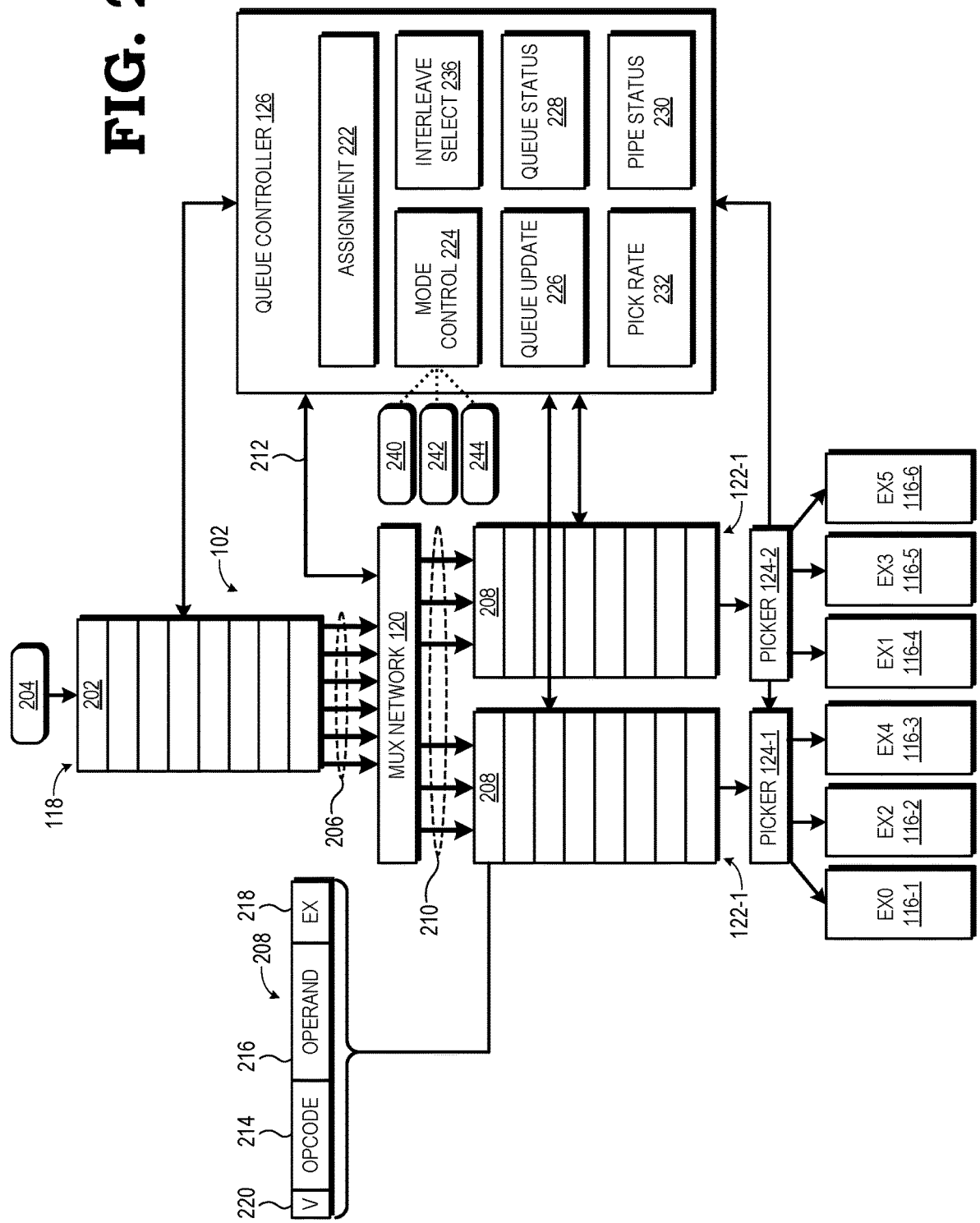
FIG. 2 is a block diagram illustrating the multimodal distributed scheduler of FIG. 1 in greater detail in accordance with some embodiments.

FIG. 2 illustrates an implementation of the multimodal distributed scheduler 102 in greater detail in accordance with some embodiments. In this example, the NSQ 118 includes a plurality of queue entries 202, wherein each queue entry 202 able to store an instruction operation 204 received from the instruction front end 104. The NSQ 118 operates as a first-in, first-out (FIFO) queue and includes a plurality of output ports 206, each output port capable of outputting a corresponding buffered instruction operation 204 from the NSQ 118 during an allocation cycle. Accordingly, the NSQ 118 has an ability to output N instruction operations per allocation cycle, where N represents the number of output ports 206. Each of the SQs 122-1 and 122-2 includes a plurality of queue entries 208, wherein each queue entry 208 is able to buffer an instruction operation 204 allocated to the corresponding SQ 122 from the NSQ 118. To this end, each SQ 122 includes a plurality of input ports 210, each of which is able to write a received instruction operation to a corresponding queue entry 208 of the receiving SQ 122. In at least one embodiment, the total number of input ports 210 for all of the SQs 122 is equal to the number N of output ports 206 of the NSQ 118. Thus, if each SQ 122 includes K input ports 210, then N=K*J, where J is the number of SQs 122. To illustrate, in the illustrated implementation the NSQ 118 includes six output ports 206 (N=6) and each of SQ 122-1 and SQ 122-2 (J=2) includes 3 input ports (K=3). Thus, in this implementation, during any given allocation cycle, up to six (6) instruction operations are able to be allocated from the NSQ 118 to the SQs 122-1 and 122-2, with the SQs 122-1 and 122-2 each being able to receive up to three (3) instruction operations during an allocation cycle.

The mux network 120 operates to allocate instruction operations 204 from the NSQ 118 among the SQs 122-1 and 122-2 based on a specified allocation mode. To this end, the mux network 120 includes one or more levels of multiplexers that connect the output ports of the NSQ 118 to the input ports 210 of the SQs 122-1, 122-2 such that each output port 206 is connectable to any of the input ports 210. The queue controller 126 operates to control the mux network 120 via control signaling 212 so as to direct each instruction operation 204 being allocated from the NSQ 118 between an associated output port 206 to a corresponding input port 210 of the SQ 122 to which the instruction operation 204 is being allocated.

Each queue entry 208 of the SQs 122-1, 122-2 can buffer an instruction operation 204 allocated from the NSQ 118 before the instruction operation 204 is picked for execution by the associated picker 124. In the illustrated embodiment, the queue entry 208 includes a number of fields pertaining to the buffered instruction operation 204, including an opcode field 214 to store an opcode or other identifier of the type of instruction operation to be executed and one or more operand fields 216 to store register identifiers for any source or destination registers to be used during execution of the instruction operation 204 or any immediate or displacement values used during this execution. Further, as described below, in some embodiments the instruction operation is pre-assigned to a particular execution pipe, and thus the queue entry 208 further includes an assignment field 218 to store an identifier of any execution pipe pre-assigned to the corresponding instruction operation. Moreover, to facilitate invalidation and flushing of instruction operations, in at least one embodiment the queue entry 208 includes a valid field 220 to store a valid (v) bit indicating whether the corresponding instruction operation is valid or invalid for that SQ 122. The queue entries 208, in some embodiments, include additional fields (not shown), such as status fields indicating, for example, whether the instruction operation is ready to be picked for execution, dependency fields identifying dependencies between the instruction operation and other instruction operations, and the like.

The pickers 124-1, 124-2 operate to select, or "pick", instruction operations from their respective SQ 122 for execution by a selected execution pipe 116 associated with the SQ 122. This selection process typically is based on the availability of a given instruction operation to be executed at that point, as well as the current capacity of the one or more execution pipes 116 associated with the SQ 122 that are capable of executing the instruction operation. The pickers 124 thus track the instruction operations assigned or otherwise allocated to the corresponding subset of execution pipes 116 and track the states of the subset of execution pipes 116 as part of the selection process.

The execution pipes 116-1 to 116-6 each includes logic and other circuitry to execute one or more instruction operation types. In some embodiments, each execution pipe has a specialized function, such as an execution pipe for performing floating-point multiply (FMUL) operations, an execution pipe for performing floating-point add (FADD) operations, an execution pipe for performing fused multiply-add (FMU) operations, and the like. Further, in some embodiments, the SQs 122 and their associated subsets of execution pipes are "symmetric" in that each SQ 122 has the same configuration of execution pipes associated therewith. That is, the execution pipe configuration for SQ 122-1 is the same as the execution pipe configuration for SQ 122-2 such that the execution pipe 116-1 (EX0) and the execution pipe 116-4 (EX1) are the same type of execution pipe, the execution pipe 116-2 (EX2) and the execution pipe 116-5 (EX3) are the same type of execution pipe, and the execution pipe 116-3 (EX4) and the execution pipe 116-6 (EX5) are the same type of execution pipe. As such, an instruction operation 204 suitable for execution at execution pipe EX0 also would be suitable for execution at execution pipe EX1, and vice versa, with the same capability relationship for execution pipe pairs EX2/EX3 and EX4/EX5.

The queue controller 126 includes various components, including an assignment component 222, a mode control component 224, a queue update component 226, a queue status component 228, a pipe status component 230, a pick rate component 232, and an interleave select component 236. Each of these components is implemented as hardware logic and associated circuitry, as programmable logic and associated circuitry, as a processor core executing software instructions representative of corresponding functionality, or as combinations thereof. The pipe status component 230 operates to monitor the execution pipes 116 to determine the current pipe occupancy for each execution pipe 116. Similarly, the queue status component 228 operates to monitor the NSQ 118 and SQs 122 to determine their current queue occupancies, rate of occupancy change, and the like. The pick rate component 232 operates to monitor the instruction operation picks made by the pickers 124-1, 124-2 and determine current pick rate statistics for the pickers 124-1, 124-2. The queue update component 226 operates to update the various fields of the queue entries 208 of the SQs 122-1, 122-2 and the queue entries 202 of the NSQ 118 based on the operations of the distributed scheduler 102, as described in detail below. The interleave select component 236, as described below, operates to select an initial SQ 122 to receive instruction operations in an interleaved allocation pattern.

As described herein, in at least one embodiment the multimodal distributed scheduler 102 supports a plurality of allocation modes so as to facilitate dynamic adaptation of the instruction operation allocation process between the NSQ 118 and the SQs 122-1, 122-2 to mitigate performance degradation due to imbalance between the SQs 122-1, 122-2 or between execution pipes 116 of the same type. As described below, this plurality of allocation modes, in one embodiment, includes a queue-first allocation mode 240 in which instruction operations are first allocated from the NSQ 118 to the SQs 122 and then pipe allocation for instruction operations follows once the instruction operations are in their respective SQs 122. Another allocation mode includes a pipe-first allocation mode 242 in which the instruction operations are first allocated to a corresponding execution pipe 116 while buffered in the NSQ 118, and the instruction operation then allocated to the SQ 122 associated with the assigned execution pipe during the NSQ-SQ allocation cycle. As yet another example, the plurality of allocation modes supported by the multimodal distributed scheduler 102 includes a speculative allocation mode 244 in which copies of each instruction operation of a subset of instruction operations are speculatively assigned from the NSQ 118 to each of the SQs 122-1, 122-2 in the same allocation cycle, and the pipe assignment is then completed thereafter, with only the copy of the instruction cycle in the SQ 122 associated with the assigned execution pipe maintained while the other copy in the other SQ 122 is invalidated and thereafter flushed. These various allocation modes are described in greater detail below with reference to FIGS. 3-7.

The mode control component 224 operates to select a particular allocation mode to implement for one or more allocation cycles in response to detecting the presence or absence of one or more indicia of imbalance between the SQs 122 or between execution pipes, as determined from information provided by the other components of the queue controller 126, such as pick rate statistics from the pick rate component 232, current pipe occupancies from the pipe status component 230, current queue occupancies from the queue status component 228, and the like. An example process of selecting the allocation mode is described below with reference to FIG. 8. The assignment component 222 operates to control the allocation of instruction operations from the NSQ 118 to the SQs 122 (e.g., via configuration of the control signaling 212) and the allocation of instruction operations to the execution pipes 116 based on the selected allocation mode and based on various queue and execution pipe status information.

Figure 3:
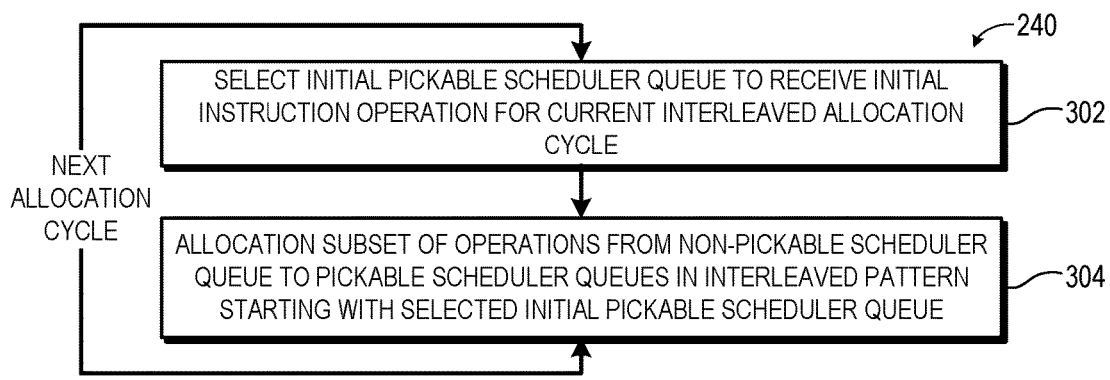
FIG. 3 is a flow diagram illustrating a queue-first allocation mode of a multimodal distributed scheduler in accordance with some embodiments.

FIG. 3 illustrates an example method of instruction operation allocation for the queue-first allocation mode 240 of the multimodal distributed scheduler 102 in accordance with some embodiments. As noted, the queue-first allocation mode 240 provides for allocation of instruction operations 204 from the NSQ 118 to the SQs 122-1, 122-2 for purposes of queue capacity balancing, with pipe assignments of the instruction operations occurring after the instruction operations are allocated to the SQs 122-1, 122-2. As each SQ 122 has K input ports 210 (K=3 in the example of FIG. 2), each SQ 122 receives up to K instruction operations in any given allocation cycle. Thus, one possible approach would be to allocate the first K instruction operations in the NSQ 118 to the SQ 122-1 and the next K instruction operations in the NSQ 118 to the SQ 122-2 for an allocation cycle. However, this block-style allocation approach can lead to imbalance when, for example, one block of K instruction operations include instruction operations dependent on a load operation, a store operation, or other operation requiring considerable clock cycles to complete, while the other block of K instruction operations has few or none of such instruction operations. One approach to mitigate this is to employ an interleaving pattern for the allocation of instructions between the SQs 122 during an allocation cycle, such that one SQ 122 gets one instruction operation, the other SQ 122 gets the next instruction operation, and so forth. In this manner, each SQ 122 gets one instruction operation in sequence and then the sequence is repeated again through all of the SQs 122 until all instruction operations for the current allocation cycle have been allocated. However, when the same SQ 122 acts as the first SQ to receive an instruction operation in the interleaving pattern for each allocation cycle, circumstances can lead to imbalanced occupancies between the SQs 122. To illustrate, if the program being executed has a run of operations that alternate between an add and a multiple, such as [ADD, MUL, ADD, MUL, ADD, MUL, ADD, MUL, ADD, MUL, ADD, MUL], an interleaving pattern of allocation between two SQs 122 that provides the first, or initial, instruction operation in each allocation cycle to the same SQ 122 will result in the six ADD operations being allocated to that SQ 122, while the six MUL operations (which take substantially longer than ADD operations to execute) end up in the other SQ 122. Thus, to avoid such potential queue imbalances, in at least one embodiment, when in the queue-first allocation mode 240 using an interleaving pattern the queue controller 126 implements a selection process for selecting the SQ 122 to receive the first, or initial, instruction operation in the subset of instruction operations to be allocated in a given cycle, wherein this selection process is based on, for example, an alternating, or ping-pong, selection or based on a pseudo-random selection. By sequentially or pseudo-randomly changing the initial receiving SQ 122 between allocation cycles, the probability that a given stream of instruction operations will result in imbalanced operation allocation between the SQs 122 and their corresponding execution pipes 116 typically is reduced compared to an implementation in which the same SQ 122 is selected as the initial receiving SQ for each allocation cycle.

Thus, in response to initiation of an allocation cycle, at block 302 the interleave select component 236 selects one of the SQs 122-1, 122-2 to receive the initial instruction operation allocated from the NSQ 118 for the allocation cycle. That is, the interleave select component 236 selects one of the SQs 122-1, 122-2 as the "first" SQ 122 in the interleaving pattern. In one embodiment, the interleave select component 236 utilizes a predefined, fixed selection sequence, such as a 1-2-1-2-1-2-1 . . . sequence (i.e., a ping-pong sequence) or a 1-1-2-2-1-1-2-2 sequence for the two SQs 122, or a 1-2-3-1-2-3-1-2-3-1 . . . sequence or a 1-2-3-2-3-1 . . . sequence in an implementation utilizing three SQs 122, and so forth. In other embodiments, the interleave select component 236 implements a pseudo-random number generator, such as a linear-feedback shift register (LFSR), to generate a pseudo-random number for each allocation cycle, and then uses one or more bits output by the pseudo-random number generator to select the initially-receiving SQ 122 for the interleaving pattern to be employed for the current allocation cycle. With the initial receiving SQ 122 selected, at block 304 the assignment component 222 controls the mux network 120 to distribute the subset of instruction operations from the NSQ 118 to the SQs 122-1, 122-2 via the output ports 206 and the input ports 210 and in accordance with the interleaving pattern, starting with the selected initial receiving SQ 122.

Figure 4:
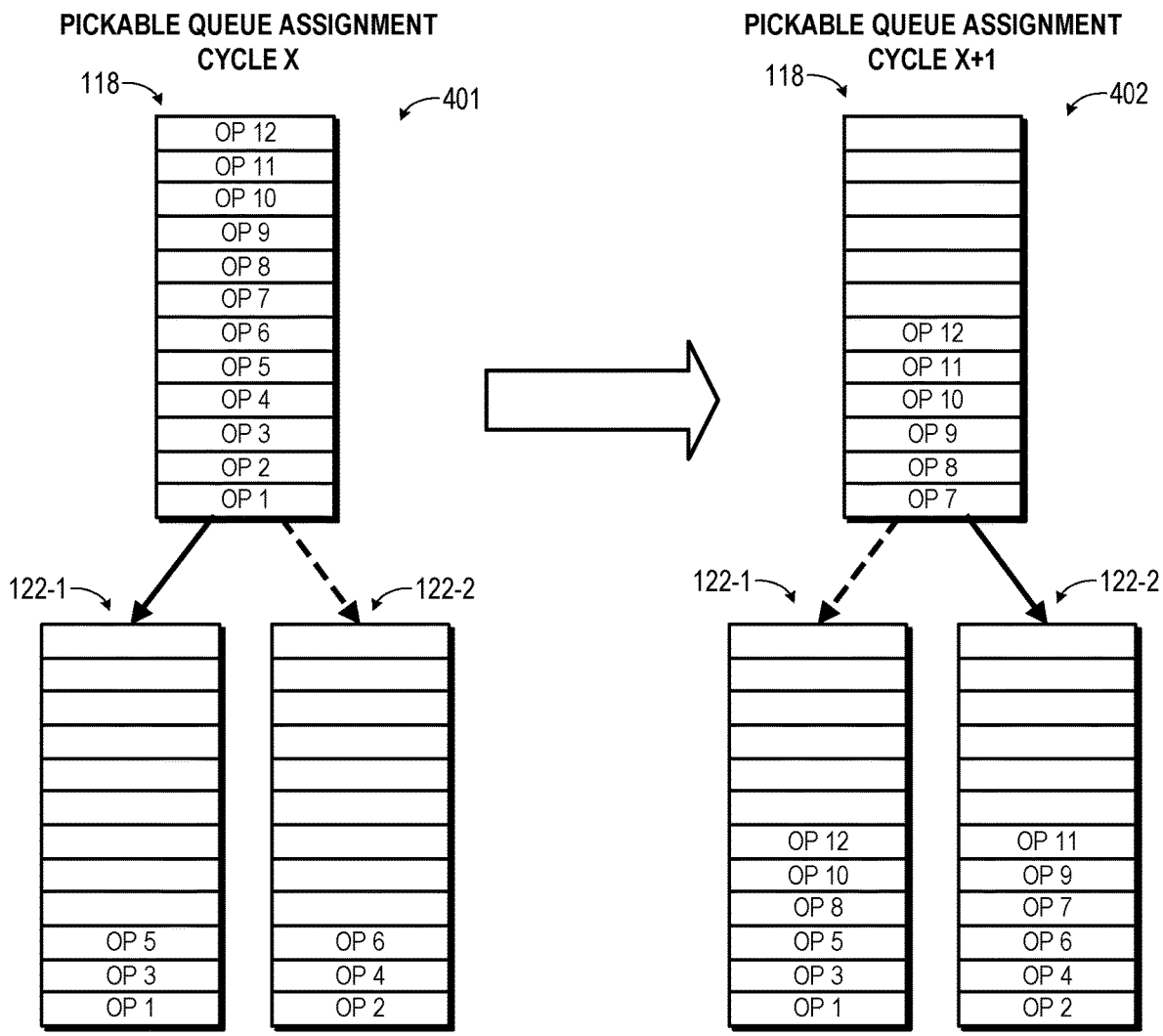
FIG. 4 is a diagram illustrating an example implementation of the method of FIG. 3 in accordance with some embodiments.

FIG. 4 illustrates an example of this process in an implementation in which six instruction operations are allocated from the NSQ 118 among the two SQs 122-1, 122-2 in an interleaved pattern using a ping-pong initial receiving SQ selection sequence. Initially, the NSQ 118 buffers twelve instruction operations, OP 1 to OP 12, with OP 1 being the oldest instruction operation (and thus first to be allocated). During allocation cycle 401, a subset of six instruction operations (OP 1 to OP 6) are to be allocated. For this allocation cycle, SQ 122-1 is selected as the initial receiving SQ, and thus the interleaved allocation pattern results in the allocation of operations OP 1, OP 3, and OP 5 to SQ 122-1 and operations OP 2, OP 4, and OP 6 to SQ 122-2. For the next allocation cycle 402, the subset of six instruction operations OP 7 to OP 12 are to be allocated, and for this allocation cycle, SQ 122-2 is selected as the initial receiving SQ using the ping-pong selection pattern. Accordingly, during allocation cycle 402, the interleaved allocation pattern results in instruction operations OP 7, OP, 9, and OP 11 being allocated to SQ 121-2 and instruction operations OP 8, OP 10, and OP 12 being allocated to SQ 121-1.

Figure 5:
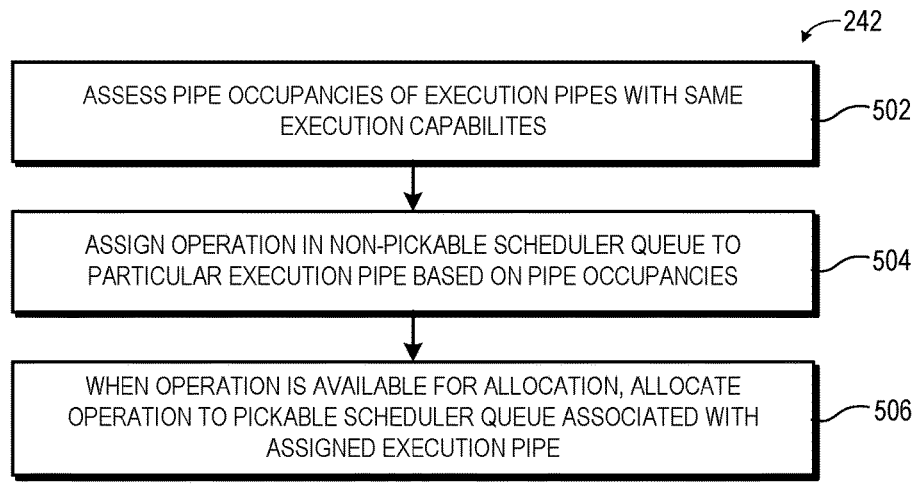
FIG. 5 is a flow diagram illustrating a pipe-first allocation mode of a multimodal distributed scheduler in accordance with some embodiments.

FIG. 5 illustrates an example method of instruction operation allocation for the pipe-first allocation mode 242 of the multimodal distributed scheduler 102 in accordance with some embodiments. While the queue-first allocation mode 240 described above has the advantage of allowing all of the output ports 206 to be utilized in an allocation cycle, and thus maximizing the number of instruction operations allocated from the NSQ 118 to the SQs 122 in an allocation cycle, a downside is that circumstances in the stream of instruction operations can result in imbalances in pipe utilization. To illustrate, a queue-first allocation could result in a disproportionate number of ADD operations in one SQ 122 compared to the other SQ 122, while the other SQ 122 ends up with a disproportionate number of MUL operations. In such a scenario, the execution pipe 116 of the first SQ 122 employed for ADD operations may get backed up while the execution pipe 116 of the first SQ 122 employed for MUL operations is idled, and for the second SQ 122 the situation is reversed in that its ADD-type execution pipe 116 is idled while its MUL-type execution pipe 116 is overloaded. The pipe-first allocation mode 242 seeks to mitigate such imbalances through assessment of the pipe occupancies of all of the execution pipes 116 in the distributed scheduler 102 and then allocating each instruction operation of the subset of instruction operations to be allocated in the current allocation cycle to the execution pipe having the lowest pipe occupancy and which is capable of executing the type of operation represented by the instruction operation.

Thus, for a given allocation cycle, at block 502 the mode control component 224 assesses the current pipe occupancies of the set of execution pipes 116 of the distributed scheduler 102 by, for example, accessing pipe occupancy data from a memory, register file, or other storage component maintained by the pipe status component 230. Generally, the pipe occupancy data indicates the number of instruction operations presently assigned to each of the execution pipes 116, and thus represents the total amount of operational "work" already committed to each execution pipe 116. With this information, at block 504 the assignment component 222 selects the next instruction operation in the NSQ 118 to be allocated in the current allocation cycle, identifies the execution pipes 116 capable of executing the selected instruction operation, and then assigns the selected instruction operation to the execution pipe 116 within the identified subset that has the lowest pipe occupancy of the subset. This assignment is made by, for example, writing a value identifying the selected execution pipe to an assignment field of the queue entry 202 of the NSQ 118 storing the selected instruction operation. When the instruction operation is available for allocation to the SQs 122 (e.g., when the instruction operation is included in the subset of instruction operations to be allocated in the current allocation cycle), at block 506 the assignment component 222 accesses the assignment field of the queue entry 202 storing the instruction operation to determine the pre-assigned execution pipe 116 and controls the mux network 120 to route the instruction operation from the NSQ 118 to an entry 208 of the SQ 122 associated with the assigned execution pipe 116. The process of blocks 502, 504, and 506 is performed for each instruction operation in the subset of instruction operations to be allocated in the given allocation cycle.

The pipe occupancy focus of the pipe-first allocation mode 242 typically is effective at maintaining pipe occupancy balance within the distributed scheduler 102. However, unlike the queue-first allocation mode 240 in which NSQ-to-SQ allocation throughput is maximized, circumstances could result in a sequence of instruction operations in the NSQ 118 being assigned to one particular SQ 122, which in turn could limit the number of instruction operations allocated in a corresponding allocation cycle due to the smaller number of input ports 210 on a give SQ 122 compared to the total number of output ports 206 of the NSQ 118. To illustrate, if the next six instruction operations in the NSQ 118 of FIG. 2 are pre-assigned to execution pipes 116 associated with SQ 122-2, then during the next allocation cycle only three instruction operations of six total possible are able to be allocated because the SQ 122-2 of FIG. 2 has only three input ports 210. In contrast, the queue-first allocation mode 240 would allow all six output ports 206 to be utilized to allocate six instruction operations in the same situation (assuming sufficient capacity in the SQs 122). As described in greater detail below with reference to FIG. 8, the multimodal distributed scheduler 102 leverages the advantages of each of the queue-first allocation mode 240 and the pipe-first allocation mode 242 by switching between these allocation modes responsive to detecting various indicia of imbalance between the SQs 122 or imbalance between the execution pipes 116.

Figure 6:
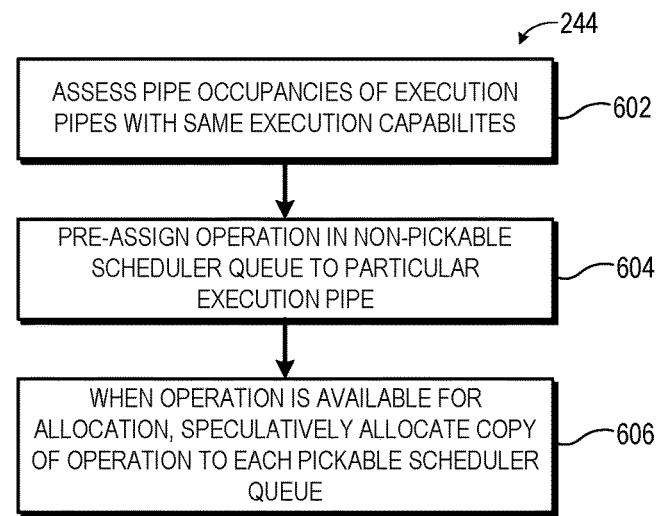
FIG. 6 is a flow diagram illustrating a speculative allocation mode of a multimodal distributed scheduler in accordance with some embodiments.

FIG. 6 illustrates an example method for instruction allocation operation for the speculative allocation mode 244 provided by the multimodal distributed scheduler 102 in accordance with some embodiments. Typically, the distributed scheduler 102 is designed and fabricated such that once an instruction operation is allocated to one of the SQs 122 it cannot be moved to the other SQ 122. As such, the distributed scheduler 102 has little recourse to correct imbalances caused by instruction operations already committed to the SQs 122 using either the queue-first allocation mode 240 or the pipe-first allocation mode 242. However, if the current pick rate of the execution pipes 116 is sufficiently low that underflow of the SQs 122 is not a significant risk, the distributed scheduler 102 employs the speculative allocation mode 244 to allocate instruction operations to the SQs 122 in a manner that allows the distributed scheduler 102 to provide balance between the instruction operations once in the SQs 122.

For the process of speculative allocation in the speculative allocation mode 244, at block 602 the mode control component 224 assesses the current pipe occupancies of the set of execution pipes 116 of the distributed scheduler 102 by, for example, accessing pipe occupancy data as described above. At block 604, the assignment component 222 identifies an unassigned instruction operation in the NSQ 118 and pre-assigns the identified instruction operation to a particular execution pipe 116 based on current pipe occupancies of those execution pipes 116 capable of executing the type of instruction operation. This pre-assignment is reflected by, for example, storing an identifier of the pre-assigned execution pipe to an assignment field of the queue entry 202 storing the instruction operation in the NSQ 118. This pre-assignment process is repeated for any number of unassigned instruction operations in the NSQ 118.

When a pre-assigned instruction operation is available for allocation to the SQs 122 (e.g., when the instruction operation is included in the subset of instruction operations to be allocated in the current allocation cycle), rather than allocating the instruction operation to a single SQ 122, instead at block 606 the assignment component 222 routes a copy of the instruction operation to each of the SQs 122 (e.g., one copy of the instruction operation to the SQ 122-1 and another copy to the SQ 122-2) regardless of which SQ 122 is associated with the execution pipe 116 pre-assigned to the instruction operation. This process is repeated for each pre-assigned instruction operation of the subset to be allocated during the current allocation cycle.

Thereafter, at block 608 the assignment component 222 selects the next speculatively allocated instruction operation in the SQs 122 in order and determines whether there is an imbalance in the current pipe occupancies of the pre-assigned execution pipe 116 and the execution pipe 116 of the same or similar type that is associated with the other SQ 122. To illustrate, if an instruction operation is pre-assigned to execution pipe 116-2 (EX2) associated with SQ 122-1, then the pipe occupancy of execution pipe 116-2 (EX2) would be compared to the current pipe occupancy of execution pipe 116-5 (EX3) associated with SQ 122-2. For this process, an imbalance between pipe occupancies between the pre-assigned execution pipe 116 and the other similar execution pipes in the other SQ 122 may be indicated by, for example, the pipe occupancy of the pre-assigned execution pipe 116 exceeding the pipe occupancy of the same type of execution pipe 116 in the other SQ 122 by at least a threshold amount. For example, assuming the threshold is set to three operations, when the pre-assigned execution pipe 116 has 8 instruction operations in flight and the other same-type execution pipe 116 has 6 instruction operations or when the other same-type execution pipe 116 has more instruction operations in flight than the pre-assigned execution pipe 116, no imbalance is assumed, whereas when the pre-assigned execution pipe 116 has 12 instruction operations in flight and the other same-type execution pipe 116 has 5 instruction operations in flight, then an imbalance is detected.

When no sufficient imbalance in pipe occupancies is detected at block 608, then at block 610 the assignment component 222 directs the queue update component 226 to maintain the valid status of the copy of the instruction operation in the SQ 122 associated with the pre-assigned execution pipe 116 and to invalidate the copy of the instruction operation in the other SQ 122. That is, when no sufficient imbalance is detected, the queue controller 126 maintains the pre-assignment of the instruction operation by maintaining the copy of the instruction operation in the SQ 122 associated with the pre-assigned execution pipe 116 while invalidating all other copies of the instruction operation in the other SQs 122. In at least one embodiment, this invalidation is achieved by clearing the valid bit in the valid field 220 of the queue entry 208 storing the copy of the instruction operation to be invalidated. In doing so, the entry 208 becomes available for flushing of the invalid copy of the instruction operation so as to make the entry 208 available to store a different instruction operation.

Otherwise, when a sufficient imbalance in pipe occupancies is detected at block 608, then at block 612 the assignment component 222 assesses various parameters, such as the current pipe occupancies, the number of following instruction operations pre-assigned to each of the execution pipes 116 of the type capable of executing the instruction operation, and the like, to dynamically select a suitable execution pipe 116 to which the instruction operation is to be finally assigned. In some circumstances, the selected execution pipe 116 is the same execution pipe to which the instruction operation was pre-assigned. In other circumstances, another execution pipe 116 of the same or similar capability is better positioned to provide timely execution of the instruction operation, and thus the assignment of the instruction operation switches to this other execution pipe. In either event, the assignment component 222 directs the queue update component 226 to maintain the valid status of the copy of the instruction operation in the SQ 122 associated with the selected execution pipe 116 and to invalidate the copy of the instruction operation in the other SQ 122. It will be appreciated that for blocks 610 and 612, when more than two SQs 122 are implemented, only a single copy of the instruction operation is maintained as valid (that is, the copy in the SQ associated with the execution pipe that is finally assigned to the instruction operation) and all other copies in the other SQs 122 are invalidated.

The speculative allocation mode 244 allows the queue controller 126 to more finely tune pipe occupancies, and thus achieve improved pipe balancing and pipe throughput, by delaying the final assignment of each instruction operation until after the instruction operation is allocated to the pickable scheduler queue level, rather than requiring execution pipe assignment at the non-pickable scheduler queue level. This delay allows the queue controller 126 additional time to assess the pipe occupancies of the compatible execution pipes 116 closer to the point at which the instruction operation would be picked for execution, and thus the queue controller 126 is able to make a more accurate assignment decision. However, the speculative allocation mode 244 requires the use of two output ports 206 for each instruction operation allocated from the NSQ 118 to the SQs 122 (one output port 206 for each copy of the instruction operation allocated), and thus the effective allocation rate of instruction operations per allocation cycle is only one-half of the maximum NSQ-to-SQ allocation rate. Thus, as described in greater detail below with reference to FIG. 8, the speculative allocation mode 244 is more effectively implemented when the current pick rate of the execution pipes 116 is sufficiently low so as to reduce or eliminate the potential for queue underflow due to the relatively slower input rate provided by the speculative allocation mode 244.

Figure 7:
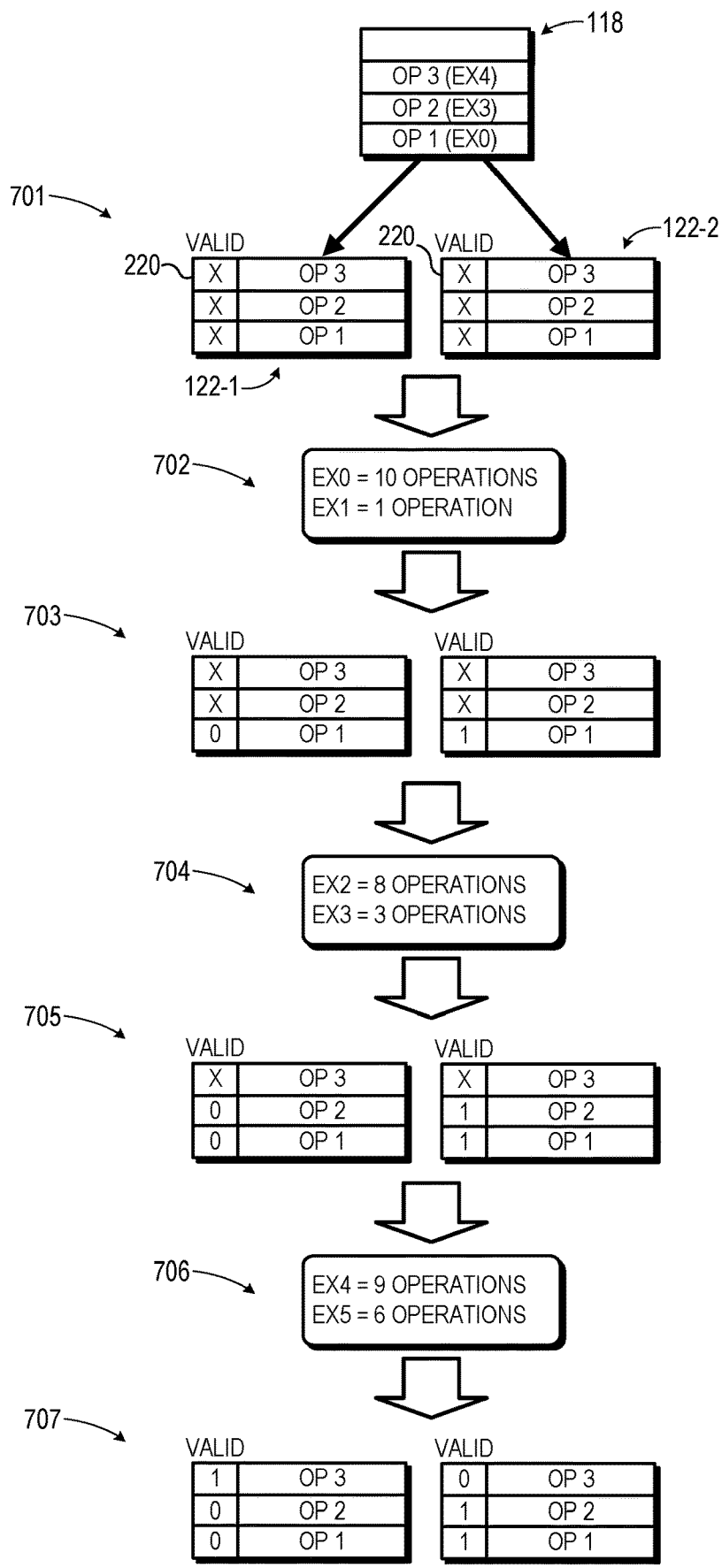
FIG. 7 is a diagram illustrating an example implementation of the method of FIG. 6 in accordance with some embodiments.

FIG. 7 illustrates an example of the speculative allocation process in an implementation in which copies of three instruction operations, OP 1, OP 2, and OP 3, are speculatively allocated from the NSQ 118 to each of the two SQs 122-1, 122-2. During the pre-assignment process (block 604), OP 1 is pre-assigned to the execution pipe 116-1 (EX0), OP 2 is pre-assigned to the execution pipe 116-5 (EX3), and OP 3 is pre-assigned to the execution pipe 116-3 (EX4). As illustrated by stage 701, during the speculative allocation process (block 606), copies of each of the instruction operations OP 1, OP 2, and OP 3 are allocated to both SQ 122-1 and SQ 122-2. At this point, the validity status of these operations is marked with an "X" in the valid field 220 (FIG. 2) of the corresponding queue entry 208 to signify that the validity of these copies of the instruction operations isn't pertinent at this point. As such, the copies initially are set to a valid state in some implementations, while in other implementations the copies are initially set to an invalid state.

As represented by stage 702, after initial allocation the assignment component 222 determines the current pipe occupancies of the execution pipes 116 capable of executing the instruction operation OP 1, which in this example reveals that the execution pipe 116-1 (EX0) has 10 pending instruction operations while the execution pipe 116-4 (EX1) has only one pending instruction operation. Thus, the difference in pipe occupancies is 9 operations. In this particular example, the threshold for indicating a pipe imbalance is six (6) operations. As such, the difference in pipe occupancies exceeds this threshold, thereby signaling a pipe imbalance. Accordingly, although OP 1 was pre-assigned to execution pipe 116-1 (EX0) associated with the SQ 122-1, due to the identified pipe imbalance, the assignment component 222 assesses this pipe occupancy imbalance in view of other conditions, such any difference in queue occupancies between the SQs 122-1 and 122-2, to dynamically select the SQ 122 and corresponding execution pipe best positioned to execute the instruction operation OP 1. In this example, the assignment component 222 determines that the execution pipe 116-4 (EX1) should be assigned the instruction operation OP 1, and thus reassigns the instruction operation OP 1 to the execution pipe 116-4 associated with the SQ 122-2. Accordingly, as represented in stage 703, the queue update component 226 signals this final assignment by clearing (e.g., setting to "0") the valid field of the entry 208 in the SQ 122-1 that stores a corresponding copy of the instruction operation OP 1 for the SQ 122-1 and by asserting (e.g., setting to "1") the valid field of the entry 208 in the SQ 122-2 that stores a corresponding copy of the instruction operation OP 1 for the SQ 122-2.

Next, as represented by stage 704, the assignment component 222 determines the current pipe occupancies of the execution pipes 116 capable of executing the instruction operation OP 2, which in this example reveals that the execution pipe 116-2 (EX2) has 8 pending instruction operations while the execution pipe 116-5 (EX3) has 3 pending instruction operations. As the current pipe occupancy of the pre-assigned execution pipe (EX3) is lower than the current pipe occupancy of the alternate execution pipe (EX2) in the other SQ 122, no pipe imbalance is signaled. Accordingly, as OP 2 was pre-assigned to execution pipe 116-5 (EX3) associated with the SQ 122-2, the assignment component 222 maintains this assignment as the final assignment. Thus, as represented by stage 705, the queue update component 226 signals this final assignment by clearing the valid field of the entry 208 in the SQ 122-1 that stores a corresponding copy of the instruction operation OP 2 for the SQ 122-1 and by asserting the valid field of the entry 208 in the SQ 122-2 that stores a corresponding copy of the instruction operation OP 2 for the SQ 122-2.

Thereafter, as represented by stage 706, the assignment component 222 determines the current pipe occupancies of the execution pipes 116 capable of executing the instruction operation OP 3, which in this example reveals that the execution pipe 116-3 (EX4) has 9 pending instruction operations while the execution pipe 116-5 (EX3) has 6 pending instruction operations. As the current pipe occupancy of the pre-assigned execution pipe (EX4) does not exceed the current pipe occupancy of the alternate execution pipe (EX5) in the other SQ 122 by at least the threshold amount of 6 operations, no pipe imbalance is signaled. Accordingly, as OP 3 was pre-assigned to execution pipe 116-3 (EX4) associated with the SQ 122-1, the assignment component 222 maintains this assignment as the final assignment. Thus, as represented by stage 707, the queue update component 226 signals this final assignment by clearing the valid field of the entry 208 in the SQ 122-2 that stores a corresponding copy of the instruction operation OP 3 for the SQ 122-2 and by asserting the valid field of the entry 208 in the SQ 122-1 that stores a corresponding copy of the instruction operation OP 3 for the SQ 122-1.

Figure 8:
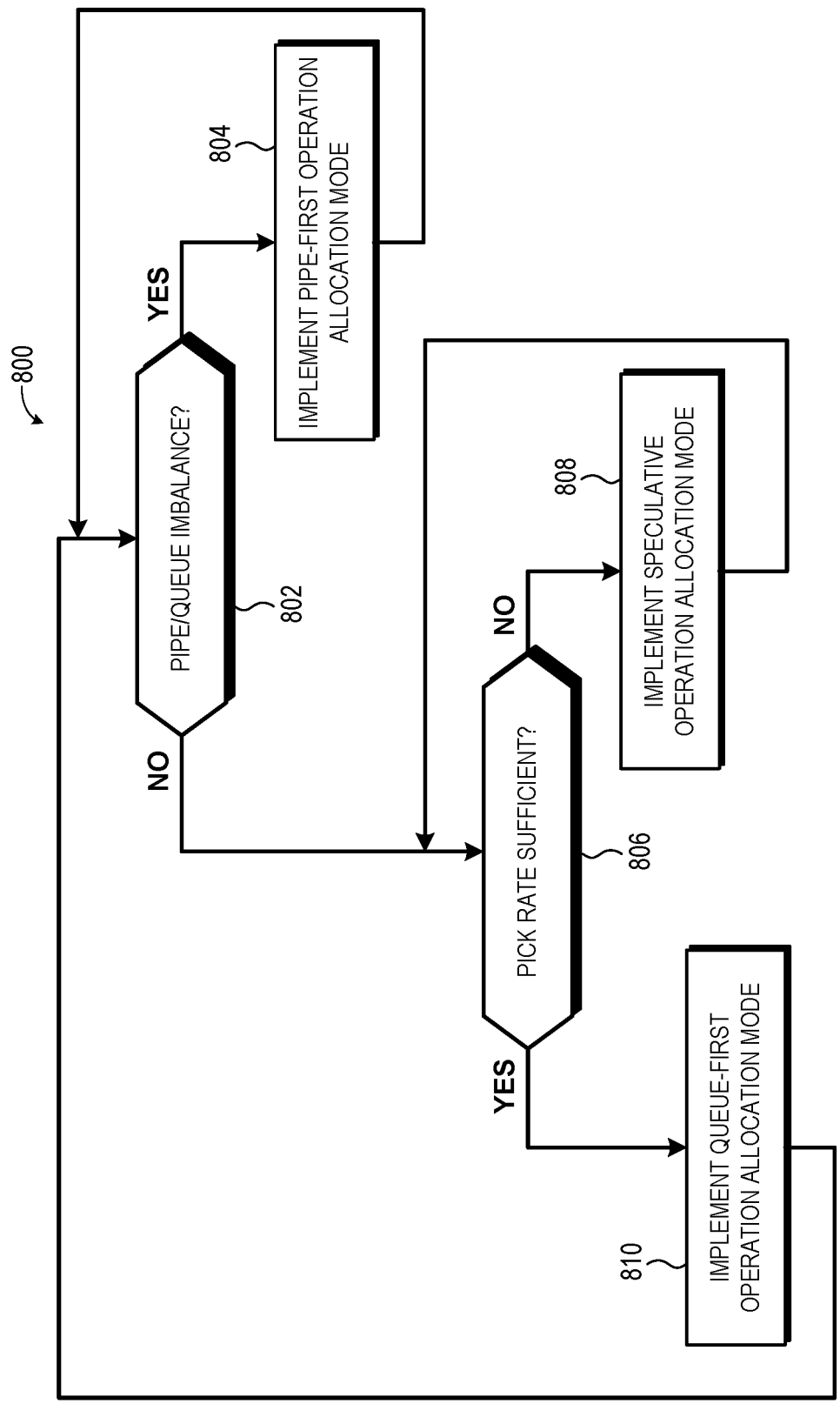
FIG. 8 is a flow diagram illustrating a method for selective activation of different allocation modes of a multimodal distributed scheduler based on various imbalance indicia in accordance with some embodiments.

FIG. 8 illustrates an example method 800 for allocation mode selection for the distributed scheduler 102 in accordance with some embodiments. As explained above, each of the queue-first allocation mode 240, pipe-first allocation mode 242, and speculative allocation mode 244 effectively mitigates imbalances in some circumstances but may contribute to (or at least not substantially correct) imbalances in other circumstances. Accordingly, as illustrated by method 800, in at least one embodiment the distributed scheduler 102 operates to switch between two or more allocation modes responsive to certain indicia of imbalance, either actual or projected. In this manner, the distributed scheduler 102 selects an allocation mode that is particularly suited to address a detected imbalance, or to avoid creating a projected imbalance.

In one embodiment, an iteration of method 800 initiates at block 802 with the mode control component 224 assessing the queue status information and pipe status information obtained by the queue status component 228 and pipe status component 230, respectively, to determine if there is a pipe imbalance, a queue imbalance, or both imbalances. To illustrate, in some embodiments, an actionable imbalance is signaled if there is an indicator that the difference in pipe occupancies between two execution pipes of the same or similar type exceeds a specified threshold. In other embodiments, an actionable imbalance is signaled if there is an indicator that the difference in queue occupancies between the SQs 122 exceeds a specified threshold. In still other embodiments, an actional imbalance is signaled only when there is both a pipe imbalance indicator and a queue imbalance indicator. To illustrate, in some embodiments, only when the queue occupancy of one of the SQs 122 exceeds the queue occupancy of the other SQ 122 by at least a first threshold amount and the pipe occupancy of one execution pipe 116 exceeds the pipe occupancy of the other execution pipe 116 of the same type by at least a second threshold amount is an imbalance in the distributed scheduler 102 signaled. Otherwise, no imbalance is signaled in this embodiment, even if one of the two thresholds is exceeded.

If the presence of queue/pipe imbalance is detected at block 802, then at block 804 the mode control component 224 configures the queue controller 126 to implement the pipe-first allocation mode 242 for subsequent allocation cycles until the allocation mode is changed. Otherwise, if the presence of queue/pipe imbalance is deemed absent at block 802, then at block 806 the mode control component 224 queries the pick rate component 232 to determine the current pick rate of the execution pipes 116 and compares this average pick rate to a defined minimum pick rate threshold. In one embodiment, the current pick rate represents an average pick rate for a sliding time window, where the average is, for example, an averaging of the pick rate of all execution pipes 116 within the sliding window, an averaging of the pick rate of execution pipes 116 of a certain type within the sliding window, an averaging of the pick rate of an individual execution pipe 116, and the like. If the average pick rate is not sufficient (that is, does not exceed this minimum pick rate threshold), then at block 808 the mode control component 224 selects the speculative allocation mode 244 for implementation at the distributed scheduler 102 for subsequent allocation cycles until the average pick rate rises above a specified threshold, which is the same threshold or a different threshold used to place the distributed scheduler 102 into the speculative allocation mode 244. As one example, a threshold pick rate of 2.5 operations per cycle is used to trigger entry into the speculative allocation mode, whereas a threshold pick rate of 2.65 operations per cycle is used to trigger an exit from the speculative allocation mode 244. Thus, if the average pick rate is sufficient (that is, exceeds the minimum pick rate threshold), at block 810 the mode control component 224 selects the queue-first allocation mode 240 for implementation by the distributed scheduler 102 for subsequent allocation cycles. The method 800 then returns back to block 802 with the mode control component 224 monitoring or polling the queue status component 228 and pipe status component 230 at a corresponding monitor/polling cycle to detect any pipe/queue imbalances or pick rate declines that have arisen in the meantime.

Although method 800 represents a flow in which, for a given analysis cycle, pipe/queue imbalances are checked first and then pick rate is analyzed, in other embodiments, the pick rate is first analyzed, and if found sufficient, then pipe/queue imbalances are assessed. Still further, in at least some embodiments, the allocation mode selection process represented by method 800 is implemented as a hardware state machine in which a presence of a pipe/queue imbalance triggers a mode change from the queue-first allocation mode 240 to the pipe-first allocation mode 242, and in which detection of an insufficient pick rate triggers a change from whatever allocation mode is currently implemented to the speculative allocation mode 244.

In some embodiments, the apparatus and techniques described above are implemented in a system including one or more integrated circuit (IC) devices (also referred to as integrated circuit packages or microchips), such as the processor 100 implementing the multimodal distributed scheduler 102 described above with reference to FIGS. 1-8. Electronic design automation (EDA) and computer aided design (CAD) software tools often are used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code includes instructions, data, or a combination of instructions and data. The software instructions representing a design tool or fabrication tool typically are stored in a computer readable storage medium accessible to the computing system. Likewise, the code representative of one or more phases of the design or fabrication of an IC device is either stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media include, but are not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
    buffering instruction operations at a first queue of a multimodal distributed scheduler of a processor;
    selecting an allocation mode of a plurality of allocation modes of the multimodal distributed scheduler based on whether at least one indicator of an imbalance at the multimodal distributed scheduler is detected, wherein each allocation mode of the plurality of allocation modes corresponds to a respective configuration for at least a portion of the multimodal distributed scheduler;
    allocating instruction operations from the first queue among a plurality of second queues according to the selected allocation mode; and
    at each second queue, selecting instruction operations buffered at the second queue for execution by execution pipes associated with the second queue.

2. The method of claim 1, wherein the plurality of allocation modes includes:
    a queue-first allocation mode in which instruction operations are allocated substantially equally among the plurality of second queues; and
    a pipe-first allocation mode in which instruction operations are allocated among the plurality of second queues based on pipe occupancies of the execution pipes associated with the second queues.

3. The method of claim 2, wherein the at least one indicator of an imbalance includes at least one of:
    a first indicator representing that at least one of the second queues has a current occupancy that exceeds a first threshold; and
    a second indicator representing that a difference between current occupancies of any two second queues exceeds a second threshold.

4. The method of claim 3, wherein selecting an allocation mode of the plurality of allocation modes includes:
    selecting the queue-first allocation mode responsive to neither the first indicator nor the second indicator being detected; and
    selecting the pipe-first allocation mode responsive to at least one of the first indicator and the second indicator being detected.

5. The method of claim 3, wherein selecting an allocation mode of the plurality of allocation modes includes:
selecting the queue-first allocation mode responsive to no more than one of the first indicator and the second indicator being detected; and
selecting the pipe-first allocation mode responsive to both of the first indicator and the second indicator being detected.

6. The method of claim 2, wherein the plurality of allocation modes further includes:
a speculative allocation mode in which a copy of each instruction operation of a set of instruction operations is allocated to each second queue of the plurality of second queues and the copy of each instruction operation of the set subsequently is invalidated in all but one second queue based on an analysis of pipe occupancies of execution pipes capable of executing a respective instruction operation.

7. The method of claim 6, wherein selecting an allocation mode of the plurality of allocation modes includes:
selecting the speculative allocation mode responsive to a current pick rate at which instruction operations are selected from the plurality of second queues for execution by a corresponding execution pipe falling below a threshold.

8. The method of claim 6, wherein:
the at least one indicator of an imbalance includes at least one of:
a first indicator representing that at least one second queue of the plurality of second queues has a current occupancy exceeding a first threshold; and
a second indicator representing that a difference between current occupancies of any two second queues of the plurality of second queues exceeds a second threshold; and
a third indicator representing that a current pick rate at which instruction operations are selected from the second queues for allocation to a corresponding execution pipe falling below a threshold; and
selecting an allocation mode of the plurality of allocation modes includes:
selecting the queue-first allocation mode responsive to no more than one of the first indicator or the second indicator being present;
selecting the pipe-first allocation mode responsive to both the first indicator and the second indicator being present; and
selecting the speculative allocation mode responsive to the third indicator being present.

9. The method of claim 6, wherein:
during the speculative allocation mode, each instruction operation of the set has a pre-assigned execution pipe and the second queue associated with the pre-assigned execution pipe retains a valid copy of the instruction operation unless a difference between a pipe occupancy of the pre-assigned execution pipe and a pipe occupancy of another execution pipe of a same type that is associated with another second queue exceeds a threshold.

10. The method of claim 1, wherein the plurality of allocation modes includes:
a queue-first allocation mode in which, for each set of instruction operations of a plurality of sets, the instruction operations of the set are allocated among the plurality of second queues using an interleaving pattern; and
wherein a second queue to receive an initial instruction operation in the interleaving pattern for a given set is selected in accordance with one of: a fixed selection sequence or pseudo-randomly.

11. A processor, comprising:
a plurality of execution pipes; and
a multimodal distributed scheduler coupled to the plurality of execution pipes and comprising:
a first queue configured to buffer instruction operations from a front end of an instruction pipeline of the processor;
a plurality of second queues, each second queue configured to buffer instruction operations allocated from the first queue for a corresponding separate subset of execution pipes of the plurality of execution pipes; and
a queue controller configured to:
select an allocation mode from a plurality of allocation modes based on whether at least one indicator of an imbalance at the multimodal distributed scheduler is detected, wherein each allocation mode of the plurality of allocation modes corresponds to a respective configuration for at least a portion of the multimodal distributed scheduler; and
configure the multimodal distributed scheduler to allocate instruction operations from the first queue among the plurality of second queues in accordance with the selected allocation mode.

12. The processor of claim 11, wherein the plurality of allocation modes includes:
a queue-first allocation mode in which instruction operations are allocated substantially equally among the plurality of second queues; and
a pipe-first allocation mode in which instruction operations are allocated among the plurality of second queues based on pipe occupancies of the execution pipes associated with the second queues.

13. The processor of claim 12, wherein the at least one indicator of an imbalance includes at least one of:
a first indicator representing that at least one of the second queues has a current occupancy that exceeds a first threshold; and
a second indicator representing that a difference between current occupancies of any two second queues exceeds a second threshold.

14. The processor of claim 13, wherein the queue controller is configured to select an allocation mode of the plurality of allocation modes by:
selecting the queue-first allocation mode responsive to neither the first indicator nor the second indicator being detected; and
selecting the pipe-first allocation mode responsive to at least one of the first indicator and the second indicator being detected.

15. The processor of claim 13, wherein the queue controller is configured to select an allocation mode of the plurality of allocation modes by:
selecting the queue-first allocation mode responsive to no more than one of the first indicator and the second indicator being detected; and
selecting the pipe-first allocation mode responsive to both of the first indicator and the second indicator being detected.

16. The processor of claim 12, wherein the plurality of allocation modes further includes:

a speculative allocation mode in which a copy of each instruction operation of a set of instruction operations is allocated to each second queue of the plurality of second queues and the copy of each instruction operation of the set subsequently is invalidated in all but one second queue based on an analysis of pipe occupancies of the execution pipes capable of executing a respective instruction operation.

17. The processor of claim 16, the queue controller is configured to select an allocation mode of the plurality of allocation modes by:
selecting the speculative allocation mode responsive to a current pick rate at which instruction operations are selected from the plurality of second queues for execution by a corresponding execution pipe falling below a threshold.

18. The processor of claim 16, wherein:
the at least one indicator of an imbalance includes at least one of:
a first indicator representing that at least one second queue of the plurality of second queues has a current occupancy that exceeds a first threshold; and
a second indicator representing that a difference between current occupancies of any two second queues of the plurality of second queues exceeds a second threshold; and
a third indicator representing that a current pick rate at which instruction operations are selected from the second queues for allocation to a corresponding execution pipe falling below a threshold; and
the queue controller is configured to select an allocation mode of the plurality of allocation modes by:
selecting the queue-first allocation mode responsive to no more than one of the first indicator or the second indicator being present;
selecting the pipe-first allocation mode responsive to both the first indicator and the second indicator being present; and
selecting the speculative allocation mode responsive to the third indicator being present.

19. The processor of claim 16, wherein:
during the speculative allocation mode, each instruction operation of the set has a pre-assigned execution pipe and the second queue associated with the pre-assigned execution pipe is to retain a valid copy of the instruction operation unless a difference between a pipe occupancy of the pre-assigned execution pipe and a pipe occupancy of another execution pipe of a same type that is associated with another second queue exceeds a threshold.

20. The processor of claim 11, wherein the plurality of allocation modes includes:
a queue-first allocation mode in which, for each set of instruction operations of a plurality of sets, the instruction operations of the set are allocated among the plurality of second queues using an interleaving pattern; and
wherein the queue controller is to select a second queue that is to receive an initial instruction operation in the interleaving pattern for a given in accordance with one of: a fixed selection sequence or pseudo-randomly.

21. A processor, comprising:
a plurality of execution pipes; and
a multimodal distributed scheduler coupled to the plurality of execution pipes and comprising:
a first queue configured to buffer instruction operations from a front end of an instruction pipeline of the processor;
a plurality of second queues, each second queue configured to buffer instruction operations allocated from the first queue for a corresponding separate subset of execution pipes of the plurality of execution pipes; and
a queue controller configured to:
configure at least a portion of the multimodal distributed scheduler, for each instruction operation of a subset of instruction operations in the first queue, to:
speculatively allocate a copy of the instruction operation from the first queue to each second queue; and
invalidate the copies of the instruction operation in all but one second queue based on current pipe occupancies of execution pipes capable of executing the instruction operation.

22. The processor of claim 21, wherein:
the instruction operation is pre-assigned to a specified execution pipe of the plurality of execution pipes; and
the queue controller is further configured to:
maintain the copy of the instruction operation in a second queue associated with the specified execution pipe as a valid copy of the instruction operation responsive to a current pipe occupancy of the specified execution pipe being within a threshold of current pipe occupancies of other execution pipes capable of executing the instruction operation; and
invalidate the copy of the instruction operation in the second queue associated with the specified execution pipe and maintain the copy of the instruction operation in a different second queue responsive to the current pipe occupancy of the specified execution pipe exceeding the current pipe occupancy of an execution pipe associated with the different second queue by at least the threshold.

23. A processor, comprising:
a plurality of execution pipes; and
a distributed multimodal scheduler coupled to the plurality of execution pipes and comprising:
a first queue configured to buffer instruction operations from a front end of an instruction pipeline of the processor;
a plurality of second queues, each second queue configured to buffer instruction operations allocated from the first queue for a corresponding separate subset of execution pipes of the plurality of execution pipes; and
a queue controller configured to configure at least a portion of the multimodal distributed scheduler to:
allocate sets of instruction operations from the first queue among the plurality of second queues in an interleaving pattern; and
for each set, select a second queue to which an initial instruction operation of the set is to be allocated in the interleaving pattern based on one of: a predefined sequence or pseudo-randomly.

24. The processor of claim 23, wherein the queue controller is further configured to select the second queue to which the initial instruction operation of the set is to be allocated in the interleaving pattern based on a predefined sequence, wherein the predefined sequence is an alternating sequence.

25. The processor of claim 23, further comprising:
a pseudo-random number generator; and
wherein the queue controller is further configured to select the second queue to which the initial instruction operation of the set is to be allocated in the interleaving pattern pseudo-randomly based on an output of the pseudo-random number generator.

* * * * *